Feb. 21, 1967

T. A. INSOLIO ETAL  3,305,853
POSITION SENSING DEVICE

Filed June 20, 1962  8 Sheets-Sheet 1

INVENTORS.
Thomas A. Insolio
John M. Chump, Sr.
BY
Webb, Mackey & Burden
THEIR ATTORNEYS

Feb. 21, 1967 T. A. INSOLIO ETAL 3,305,853
POSITION SENSING DEVICE
Filed June 20, 1962
8 Sheets-Sheet 2

INVENTORS.
Thomas A. Insolio
John M. Chump, Sr.
BY Webb, Mackey & Burden
THEIR ATTORNEYS

Feb. 21, 1967 T. A. INSOLIO ETAL 3,305,853
POSITION SENSING DEVICE
Filed June 20, 1962 8 Sheets-Sheet 4

INVENTORS.
Thomas A. Insolio
John M. Chump, Sr.
BY
Webb Mackey & Burden
THEIR ATTORNEYS

INVENTORS.
Thomas A. Insolio
John M. Chump, Sr.
BY
Webb, Mackey + Burden
THEIR ATTORNEYS United States Patent Office 3,305,853
Patented Feb. 21, 1967

3,305,853
POSITION SENSING DEVICE
Thomas A. Insolio and John M. Chump, Sr., Jeannette, Pa., assignors to American-Saint Gobain Corporation, Kingsport, Tenn., a corporation of Delaware
Filed June 20, 1962, Ser. No. 203,862
8 Claims. (Cl. 340—259)

This invention relates to a position sensing device and more particularly to a device that senses an abnormal position of a sheet of glass as it is being drawn vertically from a molten bath of glass.

Our position sensing device will be described in conjunction with the Fourcault process of making sheet glass. It should be understood, however, that our position sensing device may be used with any vertical glass drawing process wherein the glass sheet is drawn vertically between a plurality of sets of rolls and the rolls propel the glass sheet vertically.

In the Fourcault process, molten glass flows from a melting furnace through canals to a plurality of drawing pits. Drawing machines are arranged to draw sheets of glass upwardly from the molten bath of glass continuously fed to the various drawing pits. The molten glass flows or wells upwardly through a slot in the debiteuse and is drawn vertically through the drawing pit and a vertical cooling lehr by means of mechanically driven drawing rolls in the lehr. The melting furnace may be designed to supply molten glass to one or a plurality of drawing machines. In the nine drawing machine installation, the melting furnace and canals are arranged to feed the molten glass to three wings. Each of the wings has three drawing pits and three drawing machines so that nine sheets of glass are being continuously drawn from a single source of molten glass.

The drawing operation for the glass sheet is initiated by means of a bait lowered by a cable between the sets of drawing rolls and through the slot in the debiteuse into the molten bath. The drawing rolls are spaced apart for this operation. The bait with the molten glass adhering thereto is pulled upwardly between the drawing rolls. As the sheet of glass passes between each pair of rolls, these rolls grip the sheet and continuously draw the sheet of glass from the molten bath. The rolls in the cooling lehr are mechanically connected to a common drive mechanism and are driven at the same speed. All the rolls, above the first set of rolls, are in continuous contact with the glass sheet as it moves upwardly and serve as the upward propelling mechanism for the glass sheet.

The first rolls, which are the lowermost rolls, are also mechanically connected to the common roll driving mechanism and are rotating at the same speed as the other pairs of rolls in the lehr. The first rolls, however, because of their relative position adjacent the drawing pit, are employed only at the beginning of the drawing operation or when certain malfunctions in the glass drawing operation arise. The glass sheet as it moves upwardly between the first rolls is at an elevated temperature and is in a soft, semimolten state. The first rolls, therefore, are maintained in spaced relation with the glass sheet during the drawing operation so that they do not mark the sheet as it passes therebetween. The first rolls are moved into contact with the glass sheet only during the initial start-up and when malfunctions in the drawing operation occur.

The speed at which the glass sheet is drawn from the molten bath of glass determines the number of rolls that are maintained in spaced relation with the glass sheet. It has been found when the drawing speed is increased beyond a predetermined speed the glass is soft as it passes between the second set of rolls and the second set of rolls will mark the glass sheet. The description herein is restricted to the controlling of only the lowermost set of rolls. It should be understood, however, that our position sensing device can, with equal facility, be employed to control more than one set of rolls.

In the glass drawing operation there are instances when the glass sheet will start necking inwardly, that is, the lateral dimension of the glass sheet will decrease and, if permitted to continue, will increase the thickness of the glass sheet so that the glass sheet will warp and distort. One of the practices is to use a pair of stabilizer devices in contact with the edges of the glass sheet that stretch the glass sheet and maintain a predetermined lateral dimension. Because of thermal conditions or for other reasons, the lateral tension in the stretched glass sheet will cause one or both edges to pull away from one or both stabilizers and neck inwardly. It has been the practice in the past to attempt to maintain constant visual observation of the glass sheet as it is being drawn and the relative position of the stabilizer and the edges of the sheet. When the glass sheet disengages itself from the stabilizer, the operator manually reengages the stabilizer and stretches the semimolten glass sheet to the predetermined lateral dimension. This continuous visual observation of the glass sheet drawing process is only as efficient as the operator and has many readily apparent disadvantages.

In addition to the necking in of the glass sheet, there are instances when the glass sheet breaks in the lehr. The lower portion of the parted sheet will slip downwardly in the lehr and cause a portion of the sheet adjacent the drawing pit to buckle or weave. It is extremely important that the first rolls, that is, the rolls adjacent the drawing pit, be closed as soon as possible after the weaving or buckling of the sheet is detected. The first rolls then apply added drawing pull to the glass sheet and permit the continuous drawing operation to continue. Again, in the past detection of this malfunction in the drawing operation was dependent on visual observation. If, fortuitously, the operator noticed the sheet beginning to buckle or weave, he would manually close the first rolls. If, however, the operator was distracted during this crucial period, the drawing machine would lose the sheet and the continuous drawing operation would be interrupted. The cleaning of the drawing pit and the restarting operation were both expensive and time consuming and substantial loss in production accompanied the interruption in the process.

Another malfunction that occurs in the vertical drawing operation is a situation which is termed "border twist," that is, the glass sheet adjacent one edge will twist because of improper thermal conditions. In the past, observation was employed to detect this malfunction.

Sometimes when the glass sheet starts to slip downward, it will slip sidewise and move laterally from its normal centered drawing direction. The detection of this malfunction was also made in the past by visual observation. The closing of the first rolls prevents further sidewise slippage of the sheet and, at times, causes the sheet to again assume its normal direction through the cooling lehr.

We have discovered by employing our novel sensing device that we can now immediately determine when a malfunction in the drawing operation occurs. Our sensing device further distinguishes between the necking in of a sheet of glass, lateral edgewise deviation of the sheet from its normal center line, and downward slippage of the sheet in the lehr. We have provided, with our novel sensing device, a means to automatically close the first rolls when the glass sheet begins to move sidewise in the lehr or when it begins to slip downwardly in the lehr. With our novel sensing device we have included an audible warning system which indicates to an operator in what wing and what machine the malfunction has occurred. We have also provided a visual warning system which indicates to the operator the type of malfunction that has occurred. With these audible and visual signals the operator is immediately dispatched to the proper machine and has advance knowledge of the type of malfunction that has occurred. If the sheet has started necking in, the operator reengages a stabilizer to the edge of the glass sheet and stretches the sheet outwardly to its proper width. In the event the sheet has moved sidewise in the lehr or has slipped downwardly to cause buckling of the sheet adjacent the drawing pit, the operator then determines whether the malfunction has been eliminated, and, if it has, he then manually releases the first rolls. If the malfunction has not been eliminated, the first rolls are maintained closed and the operator remedies the malfunction in a known manner.

Briefly, our invention includes a pair of probes that are maintained in contact with the edges of the glass sheet. The probes are arranged to ride on the edge of the glass sheet and are movable with the edge of the glass sheet. An indicating means is associated with the probes and is arranged to indicate the relative movement of the probes and hence the glass sheet. Associated with the indicating means of both probes is an electric circuit that is arranged to distinguish the signals of both of the probes, and to distinguish between necking in, lateral movement, and the weaving or buckling of the glass sheet. For example, during the necking in of the glass sheet, both probes are arranged to move toward each other. The indicating means in one or both of the probes closes preselected contacts to complete a circuit which then energizes the audible alarm system. If the sheet begins to weave or buckle, the probes follow the glass sheet as it deviates from the vertical plane. The indicating means in one or both of the probes then close other preselected contacts to complete other circuits to both the alarm system and to the actuating mechanism to close the first rolls. The first rolls are thus automatically closed and the alarm system is actuated. If the sheet moves laterally, the probes follow the edges of the sheet and close the other contacts so that the circuits for the alarm system and the actuating mechanism to close the first rolls is energized.

The method and apparatus which comprise this invention accomplish the foregoing and other functions in a novel way, as will now be explained. Further features, objects and advantages will either be specifically pointed out or become apparent when, for a better understanding of the invention, reference is made to the following written description, taken in conjunction with the accompanying drawings which form a part hereof, and in which:

FIGURES 9, 10 and 11 are views in side elevation of the probe illustrating, in FIGURE 10, the glass sheet in a normal position; in FIGURE 9 illustrating the glass sheet in an abnormal position where it has moved to the right away from the fixed portion of the probe; and in FIGURE 11 indicating a second abnormal position where the edge of the glass sheet has moved toward the fixed portion of the probe and away from the center line of the machine. FIGURES 9, 10 and 11 have a portion broken away to illustrate the relative position of the movable contactors and the fixed contactors.

Figure 1:
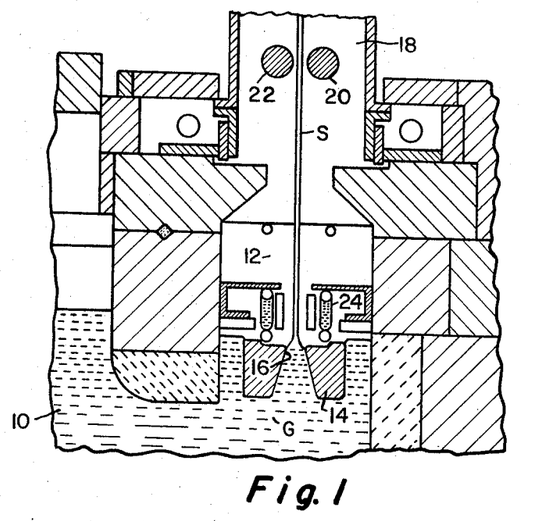
FIGURE 1 is a fragmentary sectional view in end elevation of a drawing pit and a portion of the cooling lehr.
Figure 2:
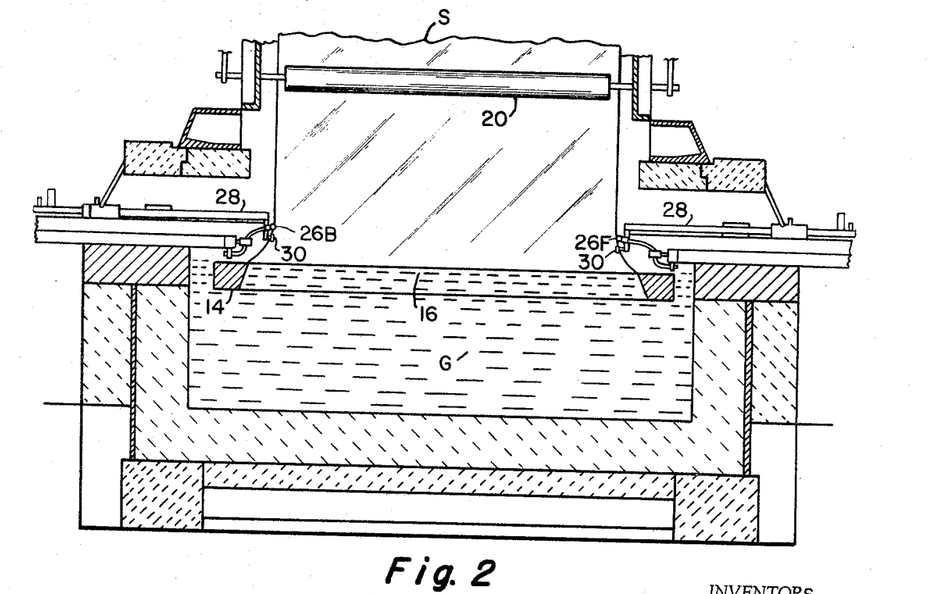
FIGURE 2 is another fragmentary sectional view in side elevation of the drawing pit illustrating the relative position of our probe devices and the stabilizers.
Figures 3, 8:
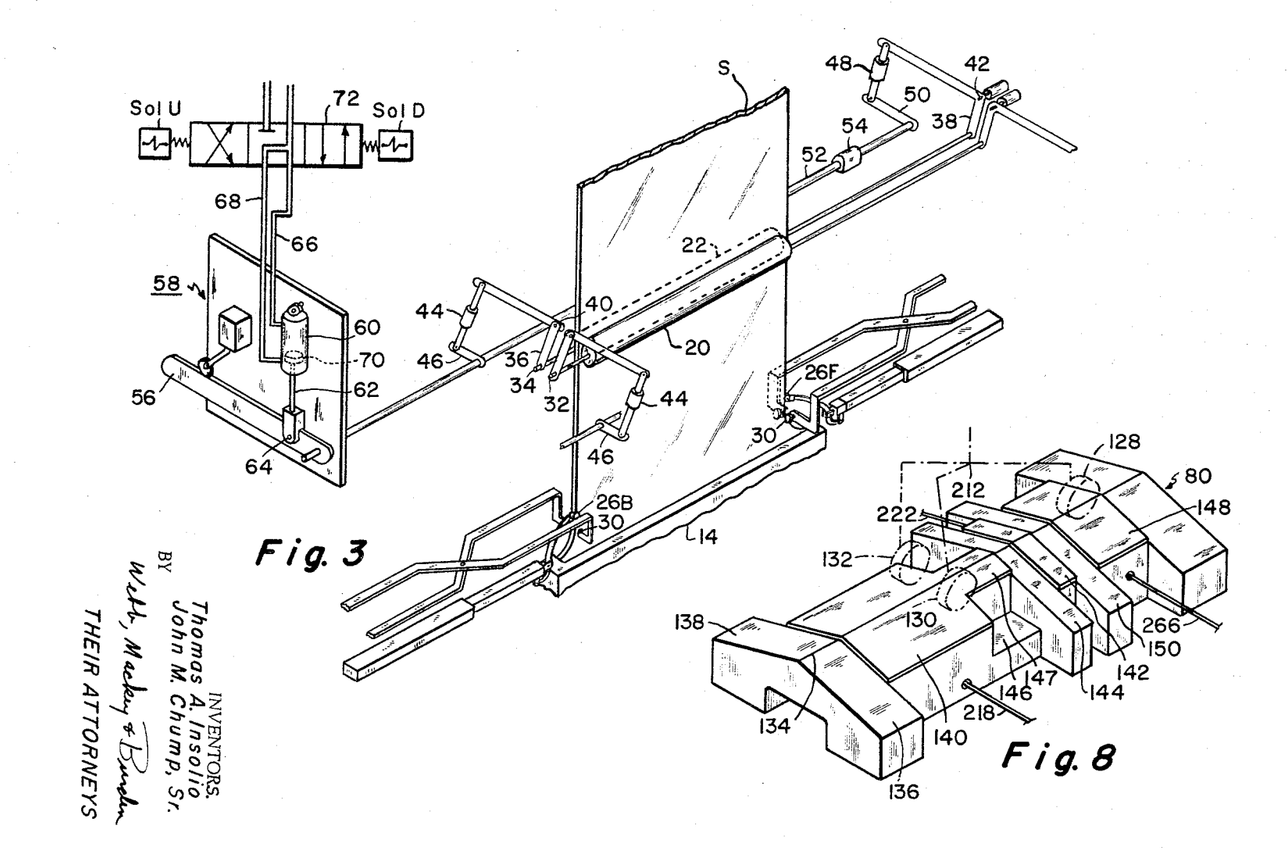
FIGURE 3 is a fragmetary perspective view illustrating a glass sheet, the first rolls, the stabilizers, the novel probes and the closing means for the first rolls.
FIGURE 8 is an exploded perspective view of the contactors secured to the fixed portion of the probe and the contactors secured to the movable portion of the probe.
Figure 4:
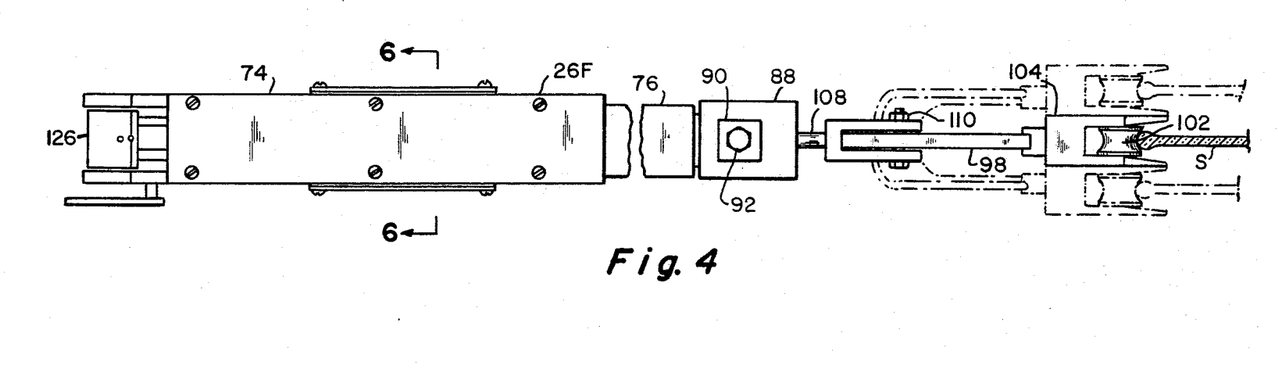
FIGURE 4 is a top plan view of one of the probes illustrating in dotted lines the various positions assumed by the glass edge contacting positions when the sheet buckles or weaves.

Referring to the drawings, and particularly to FIGURES 1, 2 and 3, the structure shown in FIGURES 1 and 2 illustrates the molten glass G fed from a canal 10 to one of the drawing pits 12. A debiteuse 14 is provided in the drawing pit 12 and the molten glass is drawn in the usual manner upwardly through slot 16 in the debiteuse, through the drawing pit 12 and into the vertically extending lehr 18. The lehr 18 has a plurality of driven drawing rolls, first rolls 20 and 22 being the only rolls illustrated in the drawing. Within the drawing pit 12 there are coolers 24 positioned on opposite sides of the glass sheet. FIGURE 3 illustrates the pair of probes generally designated by the numeral 26F and 26B, the F and B indicating the front and back probes as viewed in FIGURE 2. Stabilizers 28 have edge contacting wheels 30 which are arranged to remain in contact with the edge of the glass sheet as it is being drawn through the drawing pit 12. The glass sheet S is illustrated in FIGURE 2 with the probes 26B and 26F in contact with the edge portions and the stabilizer wheels 30 contacting the edge portions of the glass during the normal drawing operation.

FIGURE 3 illustrates the first rolls 20 and 22 with the glass sheet S passing therebetween. The driving mechanism for the first rolls is not illustrated. The rolls 20 and 22 are nonrotatably secured to shafts 32 and 34. Levers 36 and 38 support shaft 34 and are pivotally supported at 40 and 42 so that the roll 22 may be moved toward and away from glass sheet S by pivoting levers 36 and 38 about respective pivot points 40 and 42. The opposite end of lever 36 is connected through a turnbuckle 44 to another lever 46. Similarly, the end of lever 38 is connected through turnbuckle 48 to another lever 50. A shaft 52 is nonrotatably connected to levers 46 and 50 and is rotatably supported in suitable supports 54. With this construction the rotation of shaft 52 in a counterclockwise direction as viewed in FIGURE 3 moves roll 22 into contact with the glass sheet S. Roll 20 has a similar lever and shaft arrangement which permits movement of the roll 20 toward and away from glass sheet S. Roll 20, however, serves as a backing roll and is not positively urged against the glass sheet.

The shaft 52 is nonrotatably connected to a control lever 56 which forms a part of the roll closing mechanism generally designated by the numeral 58. An actuator cylinder 60 is associated with the roll closing mechanism 58 and has a piston rod 62 extending outwardly therefrom. The end of piston rod 62 is pivotally secured to control lever 56 at 64. A suitable source of pressurized fluid is provided and conduits 66 and 68 serve as pressure and exhaust conduits to supply and exhaust pressurized fluid from the cylinder 60 above and below a piston 70. Valve 72 schematically illustrated in FIGURE 3 provides the control means for conduits 66 or 68 so that they may serve as either a pressure conduit or an exhaust conduit to either extend or retract piston rod 62 and roll 22. Solenoids Sol U and Sol D are suitably connected to valve 72 and actuate valve 72 for operation of the control device 58 in the desired manner.

Figure 12:
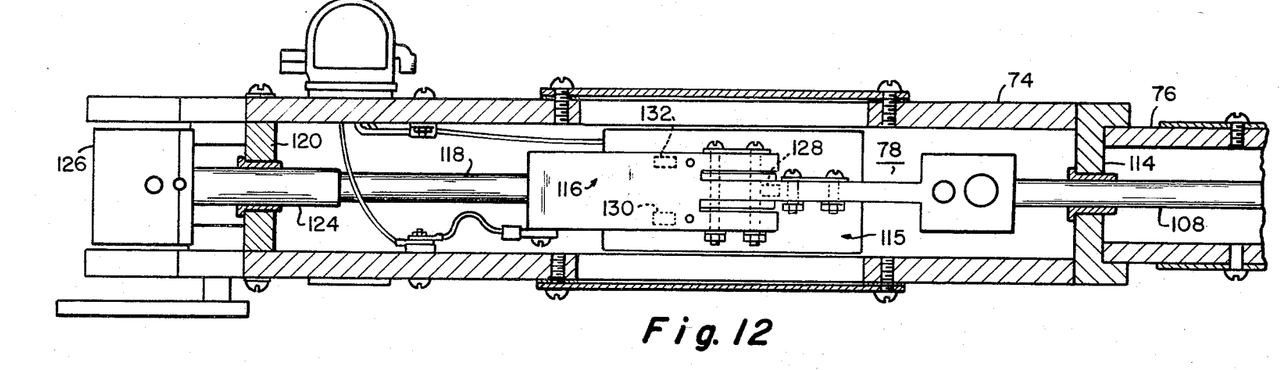
FIGURE 12 is a top plan view with the cover removed of the body portion of the probe wherein the switch containing the fixed and movable contactors is housed.

The probes 26F and 26B are similar in construction and are illustrated in detail in FIGURES 4 through 16. The probe has a body portion 74 (FIGURES 12, 13 and 14) which is rectangular in cross section and has a cylindrical portion 76 extending forwardly therefrom. The body portion 74 has a longitudinal passageway 78 in which a block 80 having a plurality of contactors is secured.

Figures 9, 10, 11:
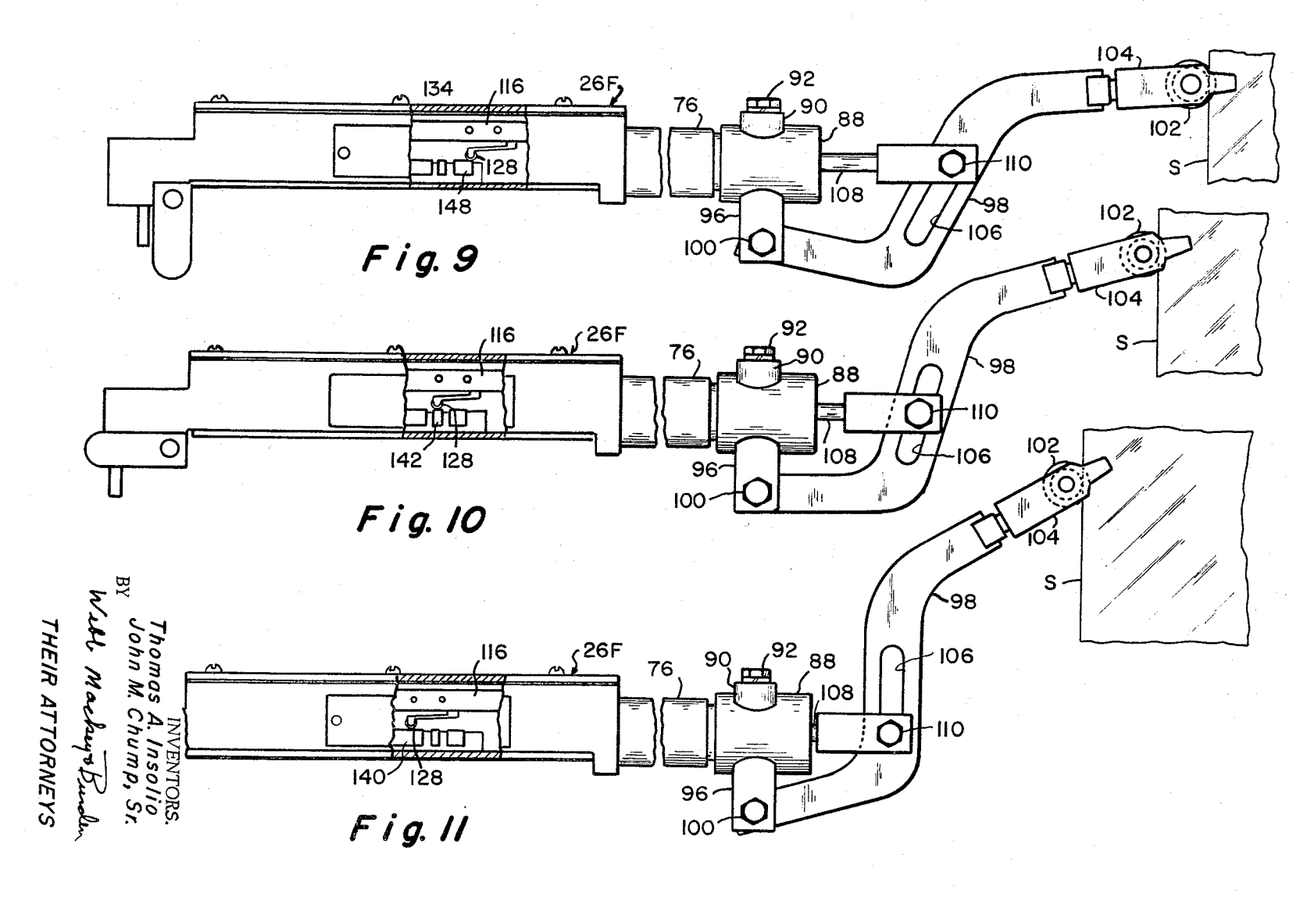
Figures 14, 15, 16, 17:
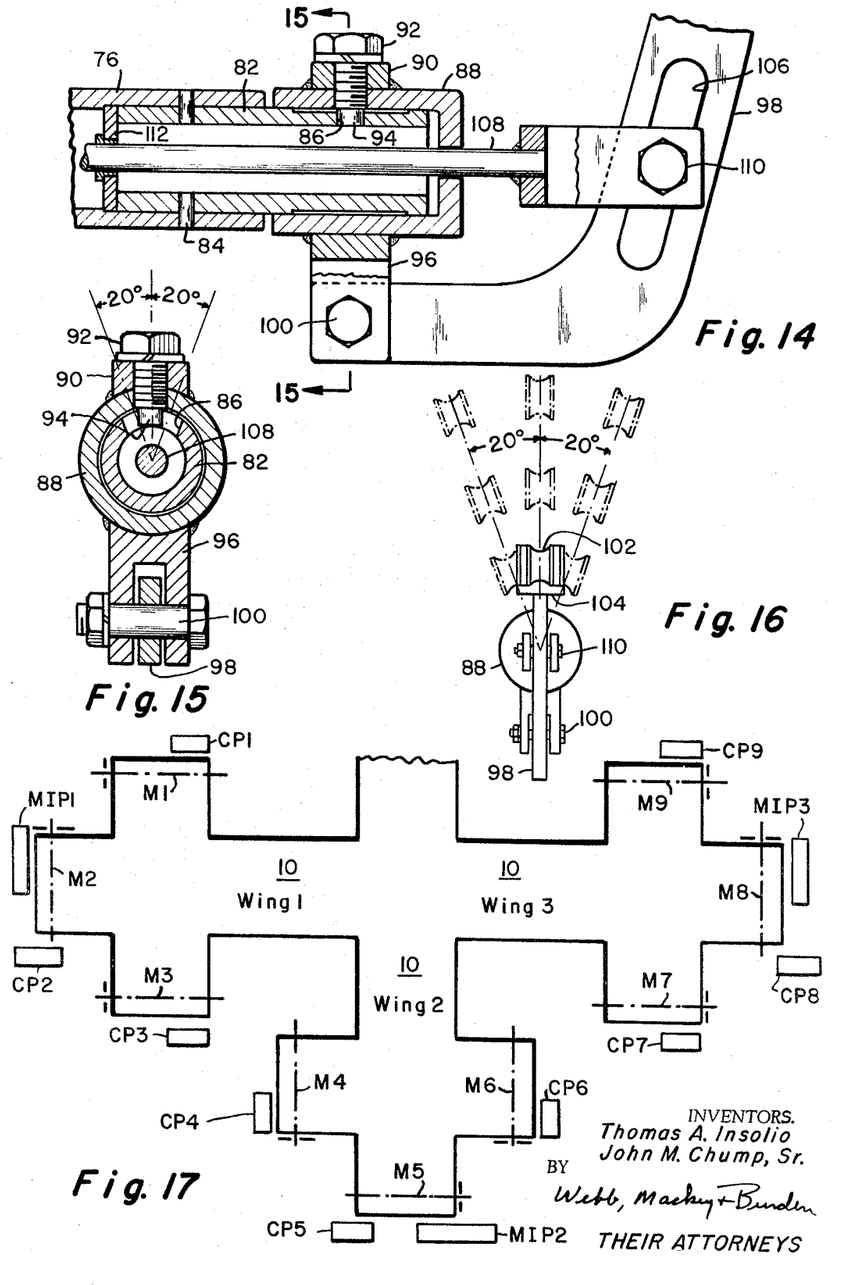
FIGURE 14 is an enlarged view in side elevation in section illustrating the movable end portion of the probe.
FIGURE 15 is a view in section taken along the line 15—15 in FIGURE 14.
FIGURE 16 is a schematic end elevation illustrating in dotted lines the various positions which can be assumed by the glass contacting portion of the probe.
FIGURE 17 is a schematic view of a conventional glass making plant and where the various wings and various machines are located.

The front cylindrical portion 76 has a separate cylindrical member 82 secured thereto by means of dowel pins 84 (FIGURE 14). The cylindrical member 82 has a circumferential slot 86 therein (FIGURE 15). A sleeve 88 is positioned on cylindrical member 82 and is rotatable relative thereto. The sleeve 88 has a threaded boss 90 through which positioning bolt 92 extends. The bolt 92 has an end portion 94 which extends into the slot 86 and maintains the sleeve 88 in fixed longitudinal position on cylindrical member 82. The radial edge portions of slot 86 limit the angular rotation of cylindrical sleeve 88 to approximately 20° on either side of a vertical axis (FIGURE 15). Secured to and depending from the sleeve 88 is a connecting member 96 to which an arm 98 is pivotally secured at 100. The arm 98 extends upwardly and forwardly from the pivot connection 100 and has a roller 102 rotatably secured to its end portion 104 (FIGURES 9 and 16). The arm 98 is so constructed and secured to sleeve 88 that it is urged away from the front end of the probe and against the edge of the glass sheet (FIGURES 9, 10 and 11). The roller 102 has a recessed circumferential portion which is arranged to ride on the bulb edge of the glass. The arm 98 has an elongated longitudinal slot 106 therein. A rod 108 is pivotally secured to arm 98 by means of shaft 110 which is arranged to ride in slot 106. The rod 108 extends through the cylindrical members 82 and 76 into the passageway 78 in body portion 74.

Suitable supports 112 and 114 are formed in the probe body portion 74 and cylindrical portion 76 to support rod 108 for reciprocal movement therein. A probe switch 115 includes fixed block 80 and movable member 116. The movable member 116 is secured at one end to rod 108 and at the other end to rod 118. The rod 118 is suitably supported by means of support 120 to move axially within the chamber 78. The rod 118 has a portion 124 extending rearwardly therefrom which is connected to a probe latch 126. The latch 126 is arranged to lock the rod 118, switch 115, rod 108 and arm 98 in a fixed position and is disengaged when the probe is in an operative position.

Figure 5:
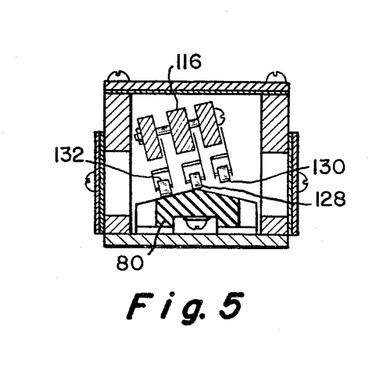
FIGURES 5, 6 and 7 are sectional views in elevation taken along the line 6—6 in FIGURE 4 illustrating the position of the movable contacts as the glass engaging portion of the probe moves with the glass sheet.
Figure 13:
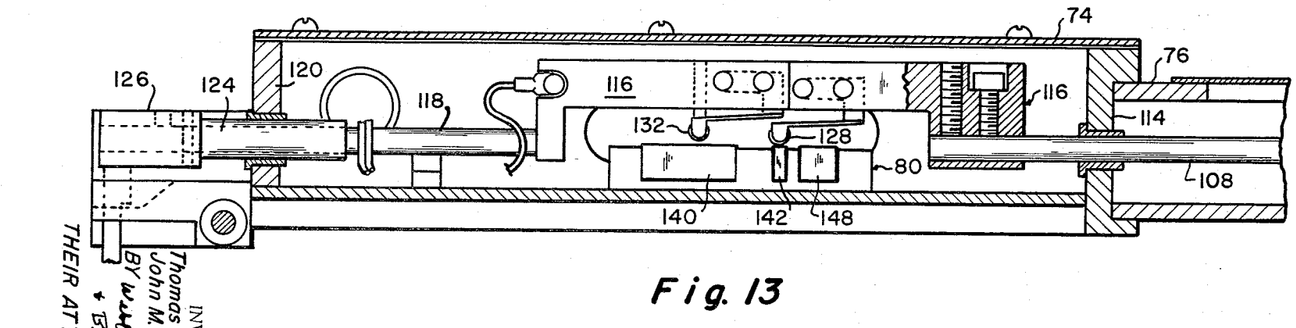
FIGURE 13 is a view in side elevation with a portion of the housing removed to further illustrate the fixed and movable contactors.

Connected to and depending from the movable member 116 are conductor wheels or contactors 128, 130 and 132 (see FIGURES 5, 8 and 13). The contactors 128, 130 and 132 are arranged to move with movable member 116 in relation to the relative position of the arm portion 104 and the probe roller 102. The contactors 130 and 132 are positioned in linear spaced relation with contactor wheel 128. Thus, within passageway 78 switch 115 includes block 80 which is fixedly secured to the probe body portion 74 and movable member 116 secured to rod 108 which, in turn, is pivotally connected to the probe arm 98 for movement therewith.

The probe body portion 74 is fixedly positioned within the drawing pit 12 and the probe arm 98 is arranged to move with the edge of the glass sheet S. The movement of the probe arm 98 relative to the probe body portion is sensed by the various individual contactors of probe switch 115, as will hereinafter be described. The probe switch 115 with fixed block 80 and movable member 116 having contactors 128, 130 and 132 are illustrated in FIGURE 8. The fixed block 80 is formed of nonconducting material and has a ridge portion 134 which extends longitudinally therealong and slanting top surfaces 136 and 138. A plate 140 which may be considered a contactor is secured to the top portion of block 80 adjacent one end portion and conforms to the angular configuration of the top surface. A second plate or contactor 142 is secured to the top surface of block 80 in spaced relation to plate 140 so that block 80 has a nonconducting top surface 144 between plates 142 and 140. Between nonconducting surfaces 144 and plate 140 there are recesses 146 which are provided to prevent other contacts closing if the probe deviates sidewise when the stabilizer is disengaged from an edge of the glass sheet and the probe arm is disengaged from the edge of the glass sheet. In this manner the rolls do not close when only the stabilizer is disengaged from the edge of the glass sheet, as will later be explained. The recesses 146 have an upstanding portion 147 which forms an extension of conductor plate 140 along the ridge 134. Another plate or contactor 148 is positioned on the top surface of block 80 in spaced relation to contactor plate 142. Between plates 142 and 148 there is a portion 150 of block 80 that is of nonconducting material. The contactor plate 140 of one of the probes is connected to wire 218. The plate 142 is connected to wire 222. Plate 148 is connected to wire 266 or wire 220 depending on whether the front or back probe is being considered.

The contactors 128, 130 and 132 on movable member 116 are all connected to common wire 212. If contactor wheel 128 is positioned on the ridge of plate 142, probe switch 115 through contactors 128 and 142 complete the circuit between wires 212 and 222 if the front probe, as later described, is considered. If contactor wheel 128 is positioned on plate 148, probe switch 115 completes a circuit between wire 212 and 266.

The probe switch 115 through the multiple contacts of contactor wheels 128, 130 and 132 and conductor plates 140, 142 and 148 provide a means for indicating the relative position of the glass sheet as it moves vertically through the lehr 18. Movable member 116 is so positioned and secured to rods 108 and 118 that the longitudinal axis of rod 108 and the ridge 134 of block 80 are coincident. Thus, the contactor wheel 128 always rides on ridge 134 irrespective of the relative position of arm 98. The contactor wheel 128 is therefore employed to indicate, through later described circuitry, the relative position of the sheet of glass and the probe body portion. As illustrated in FIGURES 9, 10, and 11, the contactor wheel 128 moves longitudinally relative to block 80 as the arm 98 follows the sheet of glass. In FIGURE 10, which is the normal position of the sheet of glass S as it moves upwardly through the drawing pit 12 and the lehr 18, the contacting wheel 128 is positioned on the ridge 134 and in contact with conductor plate 142 so that probe switch 115 completes a circuit through wires 212 and 222 for the front probe, as illustrated in the schematic electrical diagram FIGURE 18. When the sheet moves to the right of the normal position as illustrated in FIGURE 9, the contactor wheel 128 advances and rides on the plate 148 to thereby complete a circuit between wires 212 and 266. When the sheet moves to the left of its normal position as viewed in FIGURE 11, the contactor wheel 128 moves to the left and contacts conductor plate 140 to complete a circuit through wires 212 and 218.

Figure 6:
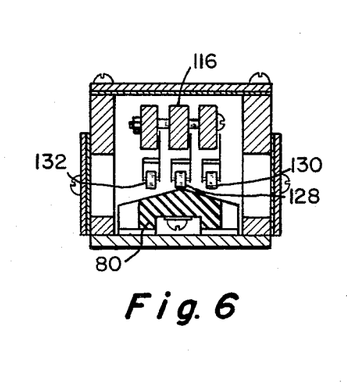
Figure 7:
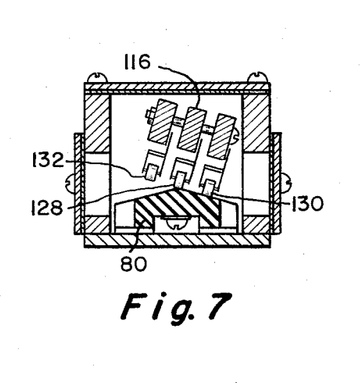

The arm 98 is free to pivot approximately 20° on either side of the vertical axis as illustrated in FIGURE 15 through the arrangement of sleeve 88 on cylindrical member 82. The relative position assumed by the end portion 104 of arm 98 is illustrated in FIGURE 16 when the arm 98 follows the sheet during a buckling or weaving malfunction. The relative rotation of arm 98 is transmitted by means of rod 108 to the movable member 116 of switch 115. The rotation of rod 108 and movable member 116 moves either wheel 130 or wheel 132 into contact with the sloping surfaces of conductor plate 140 as illustrated in FIGURES 5 and 7. The normal position of the movable member 116 and wheels 130 and 132 is illustrated in FIGURE 6 wherein both wheels 130 and 132 are spaced from the conducting surface 140. Thus, as the arm rotates as illustrated in FIGURE 16, either wheel 130 or 132 contacts conductor plate 140 to close the circuit between wires 212 and 218.

Figure 18:
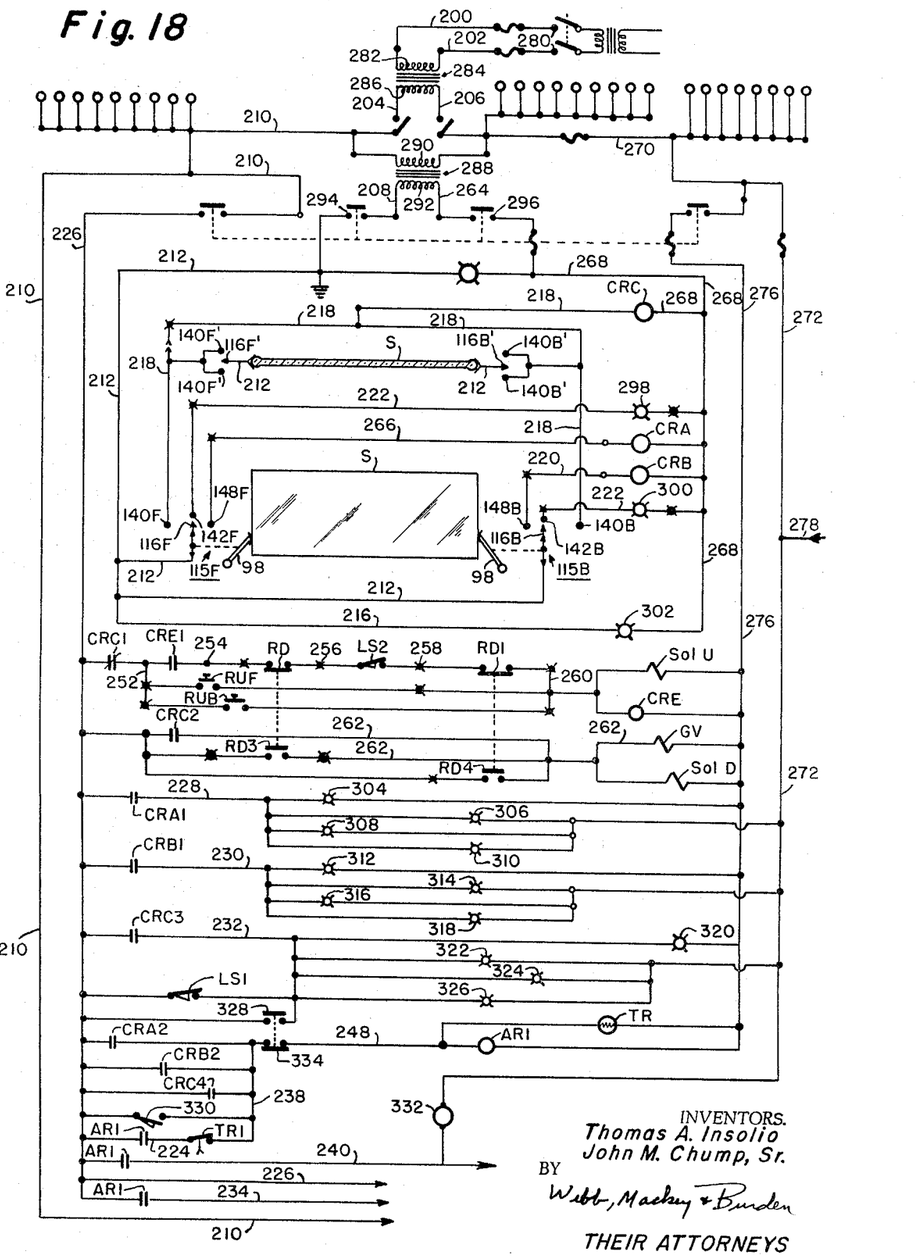
FIGURES 18 and 19 are schematic electrical diagrams of the circuitry employed for the three wings and the nine machines.
Figure 19:
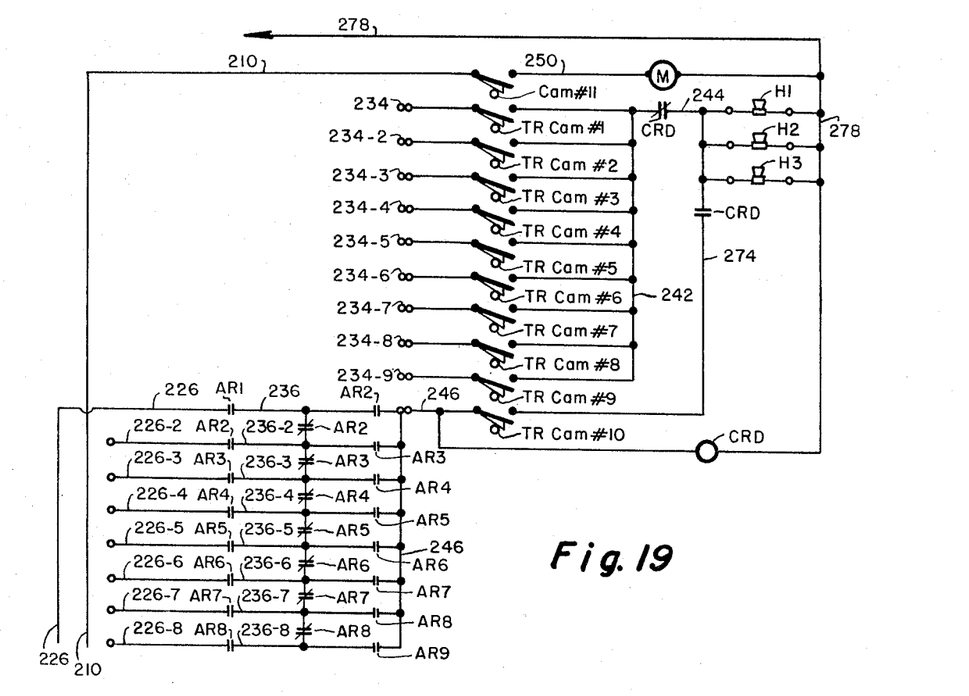

The electric control wiring for the operation of the sensing device above described is shown in two sheets of drawing which comprise FIGURES 18 and 19. These two sheets of drawing comprise a single wiring diagram of the line diagram type employing symbols and a plan of connections to illustrate in simple form the scheme of control.

In FIGURE 18 wires employed to connect the various control devices, switch contacts and the like to the power source are set forth and numbered 200 through 278. In FIGURE 18 there is shown a high voltage source of current 280, preferably a source of 440 volts A.C. The power source 280 is connected by wires or leads 200 and 202 to the primary coil 282 of transformer 284. The secondary coil 286 has leads 204 and 206 which are connected to base wires 210 and 270. The secondary coil 286 preferably has an output of 110 volts A.C. and supplies current for the circuits of machines M1 through M9. The remainder of the circuit of FIGURES 18 and 19 is employed with machine M1. It should be understood that the other drawing machines M2 through M9 have substantially the same circuit.

Another transformer 288 has a primary coil 290 connected to leads 270 and 210. The transformer 288 has a secondary coil 292 connected to wires 208 and 264. Lead 208 is connected at one end to a contact of switch 294. Wire 212 is connected to the other contact of switch 294. Wire 264 is connected at one end to a contact of switch 296 and wire 268 is connected at one end to a contact of switch 296. The transformer secondary coil 292 has an output of about 24 volts. Wire 212 may be considered the "hot" wire and wire 268 may be considered the ground wire.

As previously described, the probe switch 115 includes a movable member 116 with contactor wheels 128, 130 and 132 and fixed contactor plates 140, 142 and 148. In the electrical diagram, movable member 116 and fixed contactors 140, 142 and 148 are illustrated schematically for each probe switch 115 and are indicated as either F or B for the front and back probe switches associated with the front and back probes 26F and 26B. Since contactor wheels 128, 130 and 132 are connected to a common wire, for brevity in the electrical diagram, movable member 116 will be referred to and designated as movable contactor 116. The probe switch 115 closes the contactors by both longitudinal and rotational movement. The glass sheet in FIGURE 18 is indicated in both elevation and plan and the contactors with probe switch 115F and 115B are arranged to indicate how the probe switch 115 completes circuits between the various wires by the relative position of the probe arms.

Contactor 116F is connected to wire 212. Contactor 116B is also connected to wire 212. Contactors 140F and 140B are connected to wire 218 and a control relay CRC (218–268) is energized when either contactor 116F or 116B contacts contactor 140F or 140B of switches 115F or 115B respectively. As previously described, contactors 116F and 116B are connected to the respective probe arms 98 and follow the edge of the sheet of glass. Thus, as viewed in FIGURE 18, if the sheet of glass in elevation moves to the left, contactors 116F and 140F close to energize control relay CRC (218–268). If the sheet of glass moves to the right, contactors 116B and 140B in switch 115B close to also energize control relay CRC (218–268).

There is also illustrated the sheet of glass in plan view with contactors 140F' connected to wire 218 and contactors 140B' connected to wire 218. There is also schematically illustrated contactors 116F' and 116B' connected to wire 212 so that any buckling or weaving of the glass sheet will close contactors 116F' and 140F' or contactor 140B' and 116B' to again energize relay coil CRC (218–268). Wire 222 is connected at one end to contactor 142F and at the other end to a white centering light 298. The centering light 298 is connected to ground through wire 268. Thus, when the glass sheet is in a normal centered position, contactors 116F and 142F are closed and centering light 298 is energized. This indicates that the front probe is centered. In a normal centered position, contactors 116B and 142B are closed to energize back centering light 300 to thus indicate that the back probe is centered. Wire 266 is connected at one end to contactor 148F and at the other end to relay coil CRA. The circuit from coil CRA is completed to ground. Thus, when contactor 116F and contactor 148F close because the glass sheet moves toward the right, as viewed in FIGURE 18, control relay CRA (266–268) is energized. Similarly, wire 220 is connected at one end to contactor 148B and at the other end to control relay CRB. The circuit from control relay CRB is completed to ground. Thus, when the glass sheet moves sidewise to the left, as viewed in FIGURE 18, contactors 116B and 148B close to energize control relay CRB (220–268). A probe light 302 is connected to wires 216–268 to indicate that the probes are properly connected.

The 110 volt circuit includes base wires 226 and 276. Switch CRC1 is connected to base wire 226 and to wire 252. Switch CRE1 is connected to wires 252 and 254 and a roll-down switch RD is connected to wires 254 and 256. Limit switch LS2 is connected to wires 256 and 258 and roll-down switch RD1 is connected between wires 258 and 260. A roll-up switch RUF is connected to wires 252–260 and a roll-up switch RUB is connected to wires 252–260. Solenoid Sol U and control relay CRE are connected to wires 260–276. Normally open switch CRC2, normally open roll-down switch RD3 and normally open roll-down switch RD4 are connected to wires 226–262. Solenoid GV and solenoid Sol D are connected to wires 262–276. Normally open switch CRA1 is connected to wires 226–228 and indicator lights 304, 306, 308 and 310 are connected to wires 228–272 and are located respectively at the machine, at the front indicator panel of wing 1, at the front indicator panel of wing 2, and at the front indicator panel of wing 3. Lights 304 through 310 are white lights that indicate the front probe and the left edge of the glass sheet have moved to the right as viewed in FIGURE 18.

Normally open switch CRB1 is connected in circuit 226–230, indicator light 312 is connected in circuit 230–276, and indicator lights 314, 316 and 318 are connected in circuit 230–272. Indicator lights 312, 314, 316 and 318 are white indicator lights located at the machine, at the indicator panel for wing 1, at the indicator panel for wing 2 and at the indicator panel for wing 3. Thus, when the right edge of the sheet of glass moves to the left, as viewed in FIGURE 18, relay coil CRB (220–268) is energized by means of contacts 116B and 148B closing. In this manner the white indicator lights 312 through 318 indicate that the right edge of the sheet has moved to the left. Normally open switch CRC3 is connected to wires 226–232. Red indicator light 320 is connected in circuit 232–276 and red indicator lights 322, 324 and 326 are connected in circuit 232–272 and are positioned at the respective indicator panels. Thus, when either contacts 140F or 140B are closed with respective contacts 116F or 116B, coil CRC (218–268) is energized to close switch CRC3 (226–232) and energize lights 320, 322, 324 and 326. Normally closed limit switch LS1 is included in circuit 226–232 so that indicator lights 320 through 326 can be energized through limit switch LS1. Normally open alarm switch 328 is also included in circuit 226–232 so that if the alarm switch is closed, the red lights will so indicate at the various panels.

Circuit 226–238 includes normally open switches CRA2, CRB2, CRC4, and a normally open switch 330 which is mechanically connected to limit switch LS2 (256–258). Normally open switch AR1 is included in circuit 226–224 and timer switch TR1 is included in circuit 224–238. Timer heater TR and coil AR1 are included in circuit 248–276. Switch AR1 and motor cam holding coil 332 are included in circuit 226–272. Base wire 226 is connected to the audible circuit illustrated in FIGURE 19. A normally open switch AR1 is included in circuit 226–234. In FIGURE 19, normally open cam actuated switch TR cam #1 is connected at one end to wire 234 and at the other end to base wire 242. Similarly, normally open cam actuated switch TR cam #2 through TR cam #9 is connected to wires similar to wire 234 from the circuit illustrated in FIGURE 18 of the respective control circuits for each machine and are numbered 234–2, 234–3, 234–4, 234–5, 234–6, 234–7, 234–8 and 234–9. Power wire 210 is connected to a normally open cam actuated switch cam #11. Cam driving motor M is connected in circuit 250–278. Horns H1, H2 and H3 are connected in circuit 244–278. Normally closed switch CRD is in circuit 242–244 and normally open switch CRD is in circuit 274–244. Normally open cam actuated switch TR cam #10 is included in circuit 246–274. Control relay CRD is included in circuit 246–278.

As previously stated, wire 226 extends from the circuit illustrated in FIGURE 18 to the control circuit for the cam actuated switches illustrated in FIGURE 19, and normally open switch AR1 is connected at one end to wire 226 and the other end to wire 236. Normally open switch AR2 is connected in circuit 236–246. There are similar switches AR2, AR3, AR4, AR5, AR6, AR7 and AR8 which are connected at one end to wires, similar to wire 226 from the control circuit of the various machines, and indicated as 226, 226–2, 226–3, 226–4, 226–5, 226–6, 226–7 and 226–8. The switches AR2 through AR8 are connected to other wires 236, 236–2, 236–3, 236–4, 236–5, 236–6, 236–7, and 236–8. Other switches AR2, AR3, AR4, AR5, AR6, AR7, AR8 and AR9 are connected responsively on one side to wires 236 through 236–8 and on the other side to common wire 246. Normally closed switch AR2 is connected between wires 236 and 236–2, and similar normally closed switches AR3 through AR8 are connected between wires 236–2 and 236–3 through 236–8 as illustrated.

Figure 20:
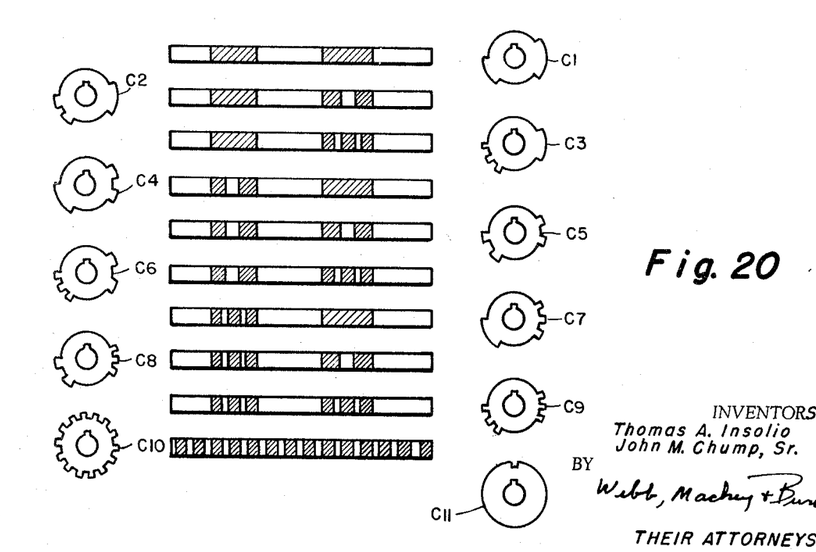
FIGURE 20 is a schematic illustration of the motor driven cams and the timing sequence of the signals transmitted by the various machines.

FIGURE 20 illustrates the cam arrangement to provide different audible signals for each machine. For example, cam C1 is so shaped that is provides a timed signal as indicated by the cross-hatched portion of the diagram opposite cam C1. Cam 2, which actuates normally open switch TR cam #2, provides a long signal to indicate wing 1 and two short signals to indicate machine 2. Similarly, cam C3 is so shaped to indicate wing 1 by a long signal and to indicate machine 3 by three short signals. Cam C4 provides two short signals indicating wing 2 and one long signal indicating machine 1. The remaining cams C5 and C9 provide distinct audible signals indicating a particular wing and particular machine. Cam C10 is so shaped that it actuates a plurality of short blasts indicating that a malfunction has occurred at more than one machine. All of the cams C1 through C11 are connected to a common drive shaft and are driven by cam motor M actuated by cam switch cam #11 (210–250). Cam C11, because of its shape, keeps cam switch cam #11 (210–250) closed until a complete revolution of the cam drive shaft has been made.

Operation

When the sheet of glass moving vertically through the lehr 18 is in a desired normal operating position, the front centering light 298 and rear centering light 300 are on, indicating that the operating conditions are normal. If the glass sheet begins necking in, either or both of the probe arms move inwardly with the sheet and both an audible alarm and a white light indicate that the sheet is necking in. Although the alarm sounds, the first rolls remain open. If the glass sheet moves sidewardly in either direction, one of the probe arms moves outwardly with the sheet. The other probe arm moves inwardly with the sheet. This outward movement of one of the probe arms and inward movement of the other probe arm sounds the audible alarm, closes the first rolls, and indicates by both red and white lights the location of the machine, the type of malfunction and the closing of the first rolls. The first rolls remain closed until opened by a push button switch. The switch to open the rolls is ineffective if the sheet has not assumed a normal position. If the sheet begins to buckle or weave adjacent the drawing pit, the probe arms rotate with the sheet of glass, close the first rolls, sound the alarm and indicate by red lights the location of the machine, the type of malfunction and the closing of the first rolls.

Normal operating conditions

The probes 26F and 26B are on center and the respective probe switches 115F and 115B are centered so that contacts 116F and 142F complete the circuit through wires 212, 222 to energize white centering light 298 (222–268) and contacts 116B and 142B are closed to complete the circuit between wires 212 and 222 to energize rear centering light 300 (222–268). Thus, front centering light 298 and rear centering light 300 are energized to indicate that the probes are in normal operating position. In this normal center position, control relays CRA (266–268) and CRB (220–268) and CRC (218–268) are de-energized and normally closed switch CRC1 (226–252) is closed. The operator actuates normally open push button switch RUF (252–260) to energize solenoid valve coil Sol U (260–276) to position the valve 72 (FIGURE 3) to supply air under pressure beneath piston 70 to open the rolls for normal operation. Simultaneously, solenoid coil CRE (260–276) is energized. Normally open switch CRE1 (252–254) is closed to hold coil CRE and solenoid Sol U (260–276). In this manner when the probes are on center during normal operation, the rolls 20 and 22 are maintained in an open position. Switch RD (254–256) and normally closed limit switch LS2 (256–258) and roll-down switch RD1 (258–260) are closed during normal operation to complete the circuit between wires 226 and 260.

Stabilizer releases edge of glass sheet S

When the sheet is reduced in lateral dimension, the probes follow the edge of the glass sheet to actuate the hereinafter described coils, relays, et cetera. For brevity in description, it is assumed that only the stabilizer at the front end of the machine is released. It should be understood, however, that both stabilizers may be released at substantially the same time and the indicator lights would indicate that both stabilizers are released from the edge of the glass sheet. The arm 98 of probe 26F moves inwardly and closes contacts 116F and 148F of the probe switch 115F, thus completing the circuit between wires 212–266 to energize soleniod coil CRA (266–268). Normally open switch CRA1 (226–228) closes and energizes signal lights 304 at the machine, 306 at the indicator panel of wing 1, 308 at the indicator panel of wing 2, and 310 at the indicator panel of wing 3. The lights 304 through 310 are white lights arranged on one side of the panel to indicate that the front probe has moved inwardly with the glass sheet to thus give a visual indication of this malfunction. Normally open switch CRA2 (226–238) is closed by control relay CRA (266–268) and relay coil AR1 (240–276) is energized through a normally closed alarm switch 334 (238–240). Normally open switch AR1 (226–240) is closed to energize the signal timer motor holding coil 332 (240–272). In this manner the signal timer begins to operate. Normally open switch AR1 (226–234) closes to provide power to wire 234. The signal timer cam opens and closes switch TR cam 1 according to the code unit in the cam. The coded signal sounds the horns H1, H2 and H3 (244–278) to designate by the coded signal the machine where the malfunction has occurred. Cam switch cam 11 (210–250) is arranged to open only at the end of the coded signal if the malfunction clears in mid-signal. If the malfunction causing the closing of contacts 116F and 148F clears before the cam motor has completed a revolution, the full code will be sounded before the timer stops.

If the momentary malfunction is of duration less than the length of the code, it is of the essence that the full code be sounded even if the duration of the malfunction is less than a second. To insure the sounding of the full code, the timer switch TR1 (224–238) maintains the relay coil AR1 (248–276) energized to continue the signal for a predetermined period even though the malfunction is cleared and solenoid coil CRA2 (226–238) is open. AR1 contacts (226–240) close to energize the motor holding coil 332 (240–276). Cam actuated switch cam #11 (210–250) closes to start cam timer motor M (250–278) and cam #11 holds M energized through one complete revolution. The thermal timer TR (248–276) times out in less than the time required for one revolution of the cam timer, switch TR1 (224–238) opens, and relay coil AR1 (248–276) is deenergized.

If the operator desires to silence the alarm while the cause for the malfunction is corrected, the alarm switch 334 (238–248) is opened to deenergized relay coil AR1 (248–276). The code signal is then completed and silenced. The opening of switch 334 simultaneously causes switch 328 (226–232) to close thereby energizing red warning lights 320 through 326 at the various panels to alert the operator that the audible signal will not sound at that particular machine.

If the malfunction occurs at more than one machine, a special audible alarm signal is required. Cam TR cam #10 becomes effective to cause a steady, uncoded signal to indicate that a malfunction has occurred at more than one machine. For example, referring to FIGURE 19, assume that the malfunction has occurred at machine 1 and machine 5. Relay coils AR1 (248–276) in machine 1 and AR5 in machine 5 are energized to close normally open switches AR1 (226–236) and AR5 (226–5–236–5) and opens normally closed switch AR5 (236–4–236–5) and closes normally open switch AR5 (236–4–246) to provide current to wire 246 for cam TR cam #10. Cam 10 is closed intermittently by motor M (250–278). Coil CRD (246–278) is energized to close normally open switch CRD (244–274) and open normally closed switch CRD (242–244) so that the signal horns transmit the intermittent signal provided by the opening and closing of cam switch TR cam #10. FIGURE 20 illustrates the signal sounded by cam 10.

*Malfunctions*

*Glass sheet slips downward.*—As previously discussed, when the glass sheet slips downward, the sheet will buckle or deviate laterally at the point adjacent the debiteuse because the glass is still soft and pliable at that point. The probe head rotates with the glass sheet as it weaves or buckles and the probe and either one or both of the probe switches 115F or 115B close contacts 116F′, 140F′ or 116B′, 140B′ to complete a circuit between wires 212 and 218 to energize relay coil CRC (218–268). Relay coil CRC closes normally open switch CRC4 (226–238) to initiate the audible signal previously described. Coil CRC also closes normally open switch CRC3 (226–232) to energize red signal lights 320 through 326 at the various panels. The red light serves to indicate that the rolls are down and a malfunction other than the stabilizer moving from the edge of the glass sheet has occurred. Normally closed switch CRC1 (226–252) is opened, thereby deenergizing solenoid Sol U and control relay CRE (260–276). The solenoid Sol U is deenergized and the up pressure is released from the cylinder, as previously described. Coil CRE (260–276) is deenergized and cannot be energized unless either normally open push button switch RUF or RUB (252–260) is closed and normally closed switch CRC1 (226–252) is closed. In this manner the circuit is arranged so that the rolls can not be raised manually unless the malfunction has been eliminated and relay coil CRC (218–268) is deenergized. Coil CRC closes normally open switch CRC2 (226–262) to energize solenoid Sol D and GV (262–276) to actuate valve 72 and provide air pressure to urge the piston 70 downwardly in cylinder 60 to positively close the roll 22 against the glass sheet. The gas valve is actuated by solenoid GV to provide a gas flame for the sheet along a lateral line below the first roll to eliminate a warp. It has been found when it is necessary to correct a malfunction the air seal in the debiteuse is broken and cool air will cause the glass sheet to warp. If the warp remains and the glass sheet solidifies, the sheet will break in the drawing rolls in the lehr. Heat, therefore, is applied to the base of the sheet below the first rolls to soften the sheet and remove the warp.

After the malfunction has been eliminated and the probes and glass sheet are returned to their normal position, solenoid coil CRC (218–268) is deenergized, and normally closed switch CRC1 (226–252) which was previously closed by coil CRC is again opened. Switch CRC2 (226–262) is opened to deenergize solenoids GV and Sol D (262–276) to release the downward pressure on the rolls. The rolls, however, by their weight, remain in contact with the glass sheet. To raise the rolls push button RUF (262–260) or push button RUB (252–260) is closed to again energize solenoid Sol U to apply air pressure to raise the rolls and relay coil CRE (260–276) to hold the rolls in the up position by closing normally open switch CRE1 (252–254). In this manner the rolls are only raised by means of the manually operated switches and are held in the raised position if the probe switches 115F and 115B are in normal position.

*Sheet slips sideward.*—If the sheet remains in the drawing plane but moves outward from the center line of the draw, both probes will follow the sheet so that one probe will move inward and the other probe will move outward. Assume the sheet has moved to the left as viewed in FIGURE 18. Contacts 116F and 148F complete the circuit through wires 212 and 218 to energize relay coil CRC and actuate the remainder of the circuitry as previously described in relation to the downward slippage of the glass sheet. The rolls are closed, the red indicator light 320 through 326 are energized at the various panels, the audible signal is sounded. Contacts 116B and 148B in switch 115B complete the circuit of wires 212 and 220 to energize relay coil CRB (220–268) which closes switch CRB1 (226–230) to energize white signal lights 312 through 318 at the various machines. Thus the signal panels at the various wings indicate by means of a red light that the rolls are down and closed, and the white lights indicate that one edge of the sheet has moved laterally from the center line of the draw. Thus, through the visual signal, the operator can then, as he is dispatched to the proper machine, select the necessary tools which he may require to remedy the malfunction.

*Manual roll release.*—There are switches provided to manually close the rolls even when a malfunction is not present. The closing of the rolls is initiated by closing either of the roll down switches RD (254–256) or RD1 (258–260) to thereby deenergize solenoids Sol U and relay coil CRE (260–276) and close switch RD3 or RD4 (226–262) to energize solenoids GV and Sol D (262–276). In this manner the roll-down push buttons perform substantially the same function as relay coil CRC (218–268). If RD (254–256) or RD1 (258–260) are released immediately, the first roll remains down and in contact with the sheet. However, Sol D (267–276) is deenergized and no pressure is exerted on the sheet. If RD or RD1 is held closed, the rolls grip the sheet under air pressure.

*Stone detection.*—During the drawing operation stones are occasionally imbedded in the glass sheet as it is drawn vertically from the debiteuse between the rolls. Any malfunction which causes outward movement of the first rolls, such as the presence of a stone in the sheet of glass, will be detected by limit switch LS2 which is associated with control lever 56 (FIGURE 3). A normally closed limit switch LS2 (256–258) opens by means of the outward movement of the rolls and deenergizes solenoids Sol U and relay coil CRE (260–276). A normally open switch 330 (226–238) is closed by limit switch LS2 to sound the audible alarm to indicate that a malfunction has occurred. The rolls close by means of their own weight and both solenoid Sol U and solenoid Sol D remain deenergized.

FIGURE 17 is a schematic illustration of a conventional glass making plant illustrating wing 1, wing 2 and wing 3, each of these wings having three machines indicated as machines M1 through M9. There is located adjacent each machine a control panel CP1 through CP9. There is also located at each of the wings a main indicator panel MIP1, MIP2 and MIP3. The various signal lights previously described are arranged to indicate at each of the main indicator panels visually where the malfunction has occurred within the wing. The audible signal is arranged to distinguish as to both the wing and the particular machine where the malfunction has occurred. In this manner an operator located in the vicinity of wing 1 can readily observe at which particular machine the malfunction has occurred.

It should be understood that although the above description is confined to a glass making plant having three wings and nine machines, the basic teaching of the control system and the signal circuitry could be equally applied to a greater or lesser number of stations.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A position sensing device comprising a body portion having a cylindrical end portion, a sleeve member positioned on said cylindrical end portion in rotatable relation thereto, an arm member pivotally connected to said sleeve member, said arm member arranged to pivot in an arcuate path in a plane containing the axis of said body portion, said arm member having a sensing portion movable in said arcuate path, said sleeve member and said arm member and sensing portion arranged to rotate about the longitudinal axis of said body portion, first contact means connected to said arm member, second contact means carried by said body portion and adapted to cooperate with said first contact means upon movement of said arm member, and indicating means actuated by said contact means to indicate the arcuate position of said sensing portion from said end portion and the angular position of said sensing portion about said longitudinal axis of said body portion.

2. A position sensing device as set forth in claim 1 including a rod connecting said arm member and said first contact means, said rod being movable longitudinally relative to said body portion as said arm member pivots in said arcuate path and being rotatable with said arm member and said sleeve member as said sleeve member rotates about said longitudinally axis of said body portion whereby movement of said rod moves said first contact means.

3. A position sensing device as set forth in claim 2 wherein each of said contact means includes a plurality of contact members, said contact members being arranged so that certain of said members are closed when said sensing portion assumes a predetermined longitudinal position relative to said end portion and other of said members are closed when said arm member moves in said arcuate path to deviate longitudinally from said predetermined position and when said arm member rotates about said longitudinal axis to deviate from a predetermined angular relation between said arm member and a predetermined plane containing said longitudinal axis of said body portion.

4. A probe device for sensing the lateral deviation of a sheet of glass from a vertical path as said sheet is being continuously drawn from a molten bath of glass which comprises a body portion having a cylindrical end portion, said body portion positioned in fixed relation relative to said sheet of glass, a sleeve member positioned on said cylindrical end portion in rotatable relation thereto, said sleeve member carrying means for embracing the edge portion of a sheet of glass extending upwardly and beyond the end of said cylindrical end portion, said means for embracing the edge portion arranged to rotate said sleeve member on said cylindrical end portion when said glass sheet deviates laterally from a vertical path, and indicating means actuated by rotation of said sleeve member to indicate lateral deviation of said sheet from a vertical path.

5. A probe device for sensing deviation of a sheet of glass from a vertical linear path as said sheet is being continuously drawn from a molten bath of glass which comprises a probe body portion positioned in fixed relation to said glass sheet, said body portion having a cylindrical end portion and a longitudinal passageway therein, a sleeve member positioned on said cylindrical end portion in rotatable relation thereto, an arm member pivotally secured at one end to said sleeve member and extending upwardly and beyond the end of said cylindrical end portion, said arm member other end having a glass edge contacting roller rotatably secured thereto, a rod slidably secured to said arm member and extending into said body portion longitudinal passageway, first contact means attached to said rod and second contact means carried by said body portion, and indicating means to indicate deviation of said glass sheet from a vertical linear path by movement of said rod either linearly or rotatably relative to said body portion to close said contact means.

6. A sensing device for indicating when a sheet of glass being drawn continuously from a molten bath of glass deviates laterally from a predetermined path due to buckling of said sheet, said device comprising a pair of probes positioned on opposite sides of said glass sheet, said probes each having sheet edge contacting means, said sheet edge contacting arranged to remain in continuous contact with the respective edges of said glass sheet and follow said glass sheet as it deviates laterally from said path, said probes each including switch means actuated by said sheet edge contacting means, said switch means of both of said probes connected in an electric circuit, signal means in said circuit, said sheet edge contacting means arranged to close said switch means when said glass sheet deviates laterally from said predetermined path to energize said signal means.

7. A position sensing device having a body portion, a cylindrical portion fixed to said body portion, a sleeve member rotatably mounted on said cylindrical portion, an arm member having a first portion connected at one end to said sleeve member and a second portion extending therefrom divergent from the axis of said sleeve member, said arm member being rotatable with said sleeve member about the axis of said cylindrical portion and said body portion, said arm members having recessed means carried by said second portion for embracing the edge of a sheet, and contact means carried by said body portion actuated by rotation of said arm member about the axis of said body portion upon deviation of said arm member from a predetermined angular relationship between said arm member and said body portion.

8. A probe device for sensing the position of an edge of a sheet of glass as said sheet is being continuously drawn from a molten bath of glass, said device comprising a body portion having a longitudinal passageway therethrough and a cylindrical end portion spaced a predetermined distance from the edge of said sheet of glass, an arm member having a first end pivotally connected with said end portion, said arm member having a second end carrying a glass edge contacting portion, said arm member and contacting portion arranged to pivot in an arcuate path in a plane including the axis of said end portion, whereby said glass edge contacting portion moves in said arcuate path upon a change in said predetermined distance between said end portion and the edge of said sheet, movable means connected to said arm member and positioned in said body portion longitudinal passageway, said movable means arranged to move longitudinally in said passageway when said contacting portion moves in response to a change in said predetermined distance between said end portion and the edge of said sheet, and first contact means carried by said movable means and second contact means carried by said body portion, said second contact means including aligned conductor plates aligned with said first contact means whereby said first contact means contacts one of said conductor plates when said end portion is a predetermined distance from the edge of said sheet and contacts other of said conductor plates when the edge of said sheet deviates from said predetermined distance.

References Cited by the Examiner

UNITED STATES PATENTS

| | | | |
|---|---|---|---|
| 763,011 | 6/1804 | Mietaschk | 33—148 |
| 972,613 | 10/1910 | Frink | 65—29 |
| 1,123,283 | 1/1915 | Harris | 200—4 |
| 1,446,300 | 2/1923 | Lawrence | 33—147 |
| 1,482,106 | 1/1924 | Avery. | |
| 2,146,442 | 2/1939 | Price | 33—147 |
| 2,215,417 | 9/1940 | Wood | 65—29 |
| 2,317,468 | 4/1943 | Krieger | 33—147 |
| 2,410,249 | 10/1946 | Spencer | 340—259 X |
| 2,557,322 | 6/1951 | Storrs | 33—181 |
| 2,613,443 | 10/1952 | Helmick | 33—126 |
| 2,659,182 | 11/1953 | Argyle | 33—147 |
| 2,669,611 | 7/1954 | Silvius | 200—4 |
| 2,848,815 | 8/1958 | Scheu. | |
| 3,044,052 | 7/1962 | Marsh | 340—259 |
| 3,100,889 | 8/1963 | Cannon | 340—259 |

FOREIGN PATENTS

| | | |
|---|---|---|
| 451,607 | 8/1936 | England. |
| 748,612 | 5/1956 | England. |

NEIL C. READ, *Primary Examiner.*

DONALL H. SYLVESTER, *Examiner.*

R. M. GOLDMAN, D. L. TRAFTON,
*Assistant Examiners.*